US012744478B2

(12) United States Patent
Carvell et al.

(10) Patent No.: US 12,744,478 B2
(45) Date of Patent: Sep. 22, 2026

(54) BOOSTED ROTOR SUPPLY CIRCUIT AND METHOD FOR IMPROVING PULSED ELECTRIC MACHINE EFFICIENCY

(71) Applicant: Tula eTechnology, Inc., San Jose, CA (US)

(72) Inventors: Paul Carvell, Santa Cruz, CA (US); Babak Mazda, Los Altos, CA (US)

(73) Assignee: Tula eTechnology, Inc., San Jose, CA (US)

( * ) Notice: Subject to any disclaimer, the term of this patent is extended or adjusted under 35 U.S.C. 154(b) by 638 days.

(21) Appl. No.: 18/362,602

(22) Filed: Jul. 31, 2023

(65) Prior Publication Data

US 2024/0088806 A1 Mar. 14, 2024

Related U.S. Application Data

(60) Provisional application No. 63/404,103, filed on Sep. 6, 2022.

(51) Int. Cl.
*H02P 6/08* (2016.01)
*H02P 21/20* (2016.01)

(52) U.S. Cl.
CPC ................ *H02P 6/08* (2013.01); *H02P 21/20* (2016.02); *H02P 2207/05* (2013.01)

(58) Field of Classification Search
CPC .......... H02P 9/48; H02P 23/02; H02P 25/022; H02P 2201/09; H02P 6/08; H02P 9/14; H02P 6/32; H02P 21/20; H02M 7/797
USPC ............................... 318/400.01, 400.31, 377
See application file for complete search history.

(56) References Cited

U.S. PATENT DOCUMENTS 4,441,043 A 4/1984 Decesare
4,482,850 A * 11/1984 Sonoda .................. H02P 23/16
4,989,146 A 1/1991 Imajo
5,099,410 A 3/1992 Divan
5,151,637 A 9/1992 Takada et al.
(Continued)

FOREIGN PATENT DOCUMENTS

CN 1829070 A 9/2006
CN 102381265 A 3/2012
(Continued)

OTHER PUBLICATIONS

Yamada et al. (EP 3471263 A1) SR Motor Control System and SR Motor Control Method (Year: 2019).*
(Continued)

*Primary Examiner* — Jorge L Carrasquillo
(74) *Attorney, Agent, or Firm* — Beyer Law Group LLP

(57) ABSTRACT

A pulsed control of an Externally Excited Synchronous Machines (EESM), including a boost circuit and method for (1) harvesting the field energy stored in rotor winding when the EESM is transitioning to the off state following an on pulses, (2) storing the harvested field energy on a storage device, (3) optionally "topping" up the harvested field energy stored on the storage device, and (4) supplying the harvested and stored field energy as a "boost voltage" to the rotor, just as the EESM is transitioning on for the next pulse, the boost voltage aiding the rotor in quickly overcoming it's start-up inductance, rapidly turning on the rotor, resulting in a much faster transition time from the off state to the on state at the start of the next pulse.

21 Claims, 10 Drawing Sheets

(56) References Cited

U.S. PATENT DOCUMENTS

| | | | |
|---|---|---|---|
| 5,325,028 | A | 6/1994 | Davis |
| 5,483,141 | A | 1/1996 | Uesugi |
| 5,640,073 | A | 6/1997 | Ikeda et al. |
| 5,731,669 | A | 3/1998 | Shimizu et al. |
| 6,291,960 | B1 | 9/2001 | Crombez |
| 6,308,123 | B1 | 10/2001 | Ikegaya et al. |
| 6,370,049 | B1 | 4/2002 | Heikkila |
| 6,424,799 | B1 | 7/2002 | Gilmore |
| 6,493,204 | B1 | 12/2002 | Glidden et al. |
| 6,605,912 | B1 | 8/2003 | Bharadwaj et al. |
| 6,829,515 | B2 | 12/2004 | Grimm |
| 6,829,556 | B2 | 12/2004 | Kumar |
| 6,906,485 | B2 | 6/2005 | Hussein |
| 6,940,239 | B2 | 9/2005 | Iwanaga et al. |
| 6,984,946 | B2 | 1/2006 | Donnelly et al. |
| 7,190,143 | B2 | 3/2007 | Wei et al. |
| 7,259,664 | B1 | 8/2007 | Cho et al. |
| 7,327,545 | B2 | 2/2008 | Konishi |
| 7,411,801 | B2 | 8/2008 | Welchko et al. |
| 7,453,174 | B1 | 11/2008 | Kalsi |
| 7,558,655 | B2 | 7/2009 | Garg et al. |
| 7,577,511 | B1 | 8/2009 | Tripathi et al. |
| 7,616,466 | B2 | 11/2009 | Chakrabarti et al. |
| 7,768,170 | B2 | 8/2010 | Tatematsu et al. |
| 7,852,029 | B2 | 12/2010 | Kato et al. |
| 7,960,888 | B2 | 6/2011 | Ai et al. |
| 7,969,341 | B2 | 6/2011 | Robbe et al. |
| 8,020,651 | B2 | 9/2011 | Zillmer et al. |
| 8,099,224 | B2 | 1/2012 | Tripathi et al. |
| 8,450,954 | B2 | 5/2013 | Pietromonaco |
| 8,744,656 | B2 | 6/2014 | Sato et al. |
| 8,768,563 | B2 | 7/2014 | Nitzberg et al. |
| 8,773,063 | B2 | 7/2014 | Nakata |
| 9,046,559 | B2 | 6/2015 | Lindsay et al. |
| 9,050,894 | B2 | 6/2015 | Banerjee et al. |
| 9,112,445 | B2 | 8/2015 | Sul et al. |
| 9,308,822 | B2 | 4/2016 | Matsuda |
| 9,495,814 | B2 | 11/2016 | Ramesh |
| 9,512,794 | B2 | 12/2016 | Serrano et al. |
| 9,630,614 | B1 | 4/2017 | Hill et al. |
| 9,702,420 | B2 | 7/2017 | Yoon |
| 9,758,044 | B2 | 9/2017 | Gale et al. |
| 9,948,173 | B1 | 4/2018 | Abu Qahouq |
| 10,060,368 | B2 | 8/2018 | Pirjaberi et al. |
| 10,081,255 | B2 | 9/2018 | Yamada et al. |
| 10,256,680 | B2 | 4/2019 | Hunstable |
| 10,273,894 | B2 | 4/2019 | Tripathi |
| 10,291,168 | B2 | 5/2019 | Fukuta |
| 10,291,174 | B2 | 5/2019 | Irie et al. |
| 10,320,249 | B2 | 6/2019 | Okamoto et al. |
| 10,340,821 | B2 | 7/2019 | Magee et al. |
| 10,344,692 | B2 | 7/2019 | Nagashima et al. |
| 10,381,968 | B2 | 8/2019 | Agirman |
| 10,476,421 | B1 | 11/2019 | Khalil et al. |
| 10,550,776 | B1 | 2/2020 | Leone et al. |
| 10,742,155 | B2 | 8/2020 | Tripathi |
| 10,763,772 | B1 | 9/2020 | Fatemi et al. |
| 10,944,352 | B2 | 3/2021 | Mazda et al. |
| 11,077,759 | B1 | 8/2021 | Srinivasan |
| 11,088,644 | B1 | 8/2021 | Carvell |
| 11,133,763 | B1 | 9/2021 | Islam |
| 11,133,767 | B2 | 9/2021 | Serrano et al. |
| 11,167,648 | B1 | 11/2021 | Carvell et al. |
| 11,228,272 | B2 | 1/2022 | Tripathi |
| 11,427,177 | B2 | 8/2022 | Serrano et al. |
| 11,623,529 | B2 | 4/2023 | Carvell et al. |
| 11,626,827 | B2 | 4/2023 | Tripathi |
| 11,628,730 | B2 | 4/2023 | Srinivasan |
| 11,695,361 | B2 | 7/2023 | Carvell et al. |
| 12,244,250 | B2 | 3/2025 | Phillips et al. |
| 12,319,147 | B2 | 6/2025 | Srinivasan |
| 12,370,907 | B2 | 7/2025 | Carvell |
| 12,556,118 | B2 | 2/2026 | Carvell et al. |
| 2001/0039926 | A1 | 11/2001 | Kobayashi et al. |
| 2002/0043954 | A1 | 4/2002 | Hallidy et al. |
| 2005/0127861 | A1 | 6/2005 | McMillan et al. |
| 2005/0151437 | A1 | 7/2005 | Ramu |
| 2005/0160771 | A1 | 7/2005 | Hosoito et al. |
| 2007/0216345 | A1 | 9/2007 | Kanamori |
| 2007/0287594 | A1 | 12/2007 | DeGeorge et al. |
| 2008/0129243 | A1 | 6/2008 | Nashiki |
| 2008/0179980 | A1 | 7/2008 | Dawsey et al. |
| 2009/0045691 | A1 | 2/2009 | Ichiyama |
| 2009/0121669 | A1 | 5/2009 | Hanada |
| 2009/0128072 | A1 | 5/2009 | Strong et al. |
| 2009/0146615 | A1 | 6/2009 | Zillmer et al. |
| 2009/0179608 | A1 | 7/2009 | Welchko et al. |
| 2009/0306841 | A1 | 12/2009 | Miwa et al. |
| 2010/0010724 | A1 | 1/2010 | Tripathi et al. |
| 2010/0201294 | A1 | 8/2010 | Yuuki et al. |
| 2010/0296671 | A1 | 11/2010 | Khoury et al. |
| 2011/0029179 | A1 | 2/2011 | Miyazaki et al. |
| 2011/0089774 | A1 | 4/2011 | Kramer |
| 2011/0101812 | A1 | 5/2011 | Finkle et al. |
| 2011/0130916 | A1 | 6/2011 | Mayer |
| 2011/0208405 | A1 | 8/2011 | Tripathi et al. |
| 2011/0227544 | A1 | 9/2011 | Crane |
| 2012/0056569 | A1 | 3/2012 | Takamatsu et al. |
| 2012/0112674 | A1 | 5/2012 | Schulz et al. |
| 2012/0169263 | A1 | 7/2012 | Gallegos-Lopez et al. |
| 2012/0217916 | A1 | 8/2012 | Wu et al. |
| 2012/0217921 | A1 | 8/2012 | Wu et al. |
| 2013/0134912 | A1 | 5/2013 | Khalil et al. |
| 2013/0141027 | A1 | 6/2013 | Nakata |
| 2013/0226420 | A1 | 8/2013 | Pedlar et al. |
| 2013/0241445 | A1 | 9/2013 | Tang |
| 2013/0258734 | A1 | 10/2013 | Nakano et al. |
| 2014/0018988 | A1 | 1/2014 | Kitano et al. |
| 2014/0028225 | A1 | 1/2014 | Takamatsu et al. |
| 2014/0130506 | A1 | 5/2014 | Gale et al. |
| 2014/0176034 | A1 | 6/2014 | Matsumura et al. |
| 2014/0217940 | A1 | 8/2014 | Kawamura |
| 2014/0265957 | A1 | 9/2014 | Hu et al. |
| 2014/0292382 | A1 | 10/2014 | Ogawa et al. |
| 2014/0354199 | A1 | 12/2014 | Zeng et al. |
| 2015/0025725 | A1 | 1/2015 | Uchida |
| 2015/0240404 | A1 | 8/2015 | Kim et al. |
| 2015/0246685 | A1 | 9/2015 | Dixon et al. |
| 2015/0261422 | A1 | 9/2015 | Den et al. |
| 2015/0297824 | A1 | 10/2015 | Cabiri et al. |
| 2015/0318803 | A1 | 11/2015 | Wu et al. |
| 2016/0114830 | A1 | 4/2016 | Dixon et al. |
| 2016/0226409 | A1 | 8/2016 | Ogawa |
| 2016/0233812 | A1 | 8/2016 | Lee et al. |
| 2016/0269225 | A1 | 9/2016 | Kirchmeier et al. |
| 2016/0373047 | A1 | 12/2016 | Loken et al. |
| 2017/0087990 | A1 | 3/2017 | Neti et al. |
| 2017/0163108 | A1 | 6/2017 | Schencke et al. |
| 2017/0331402 | A1 | 11/2017 | Smith et al. |
| 2018/0032047 | A1 | 2/2018 | Nishizono et al. |
| 2018/0045771 | A1 | 2/2018 | Kim et al. |
| 2018/0154786 | A1 | 6/2018 | Wang et al. |
| 2018/0276913 | A1 | 9/2018 | Garcia et al. |
| 2018/0323665 | A1 | 11/2018 | Chen et al. |
| 2018/0334038 | A1 | 11/2018 | Zhao et al. |
| 2019/0058374 | A1 | 2/2019 | Enomoto et al. |
| 2019/0267919 | A1 | 8/2019 | Suzuki et al. |
| 2019/0288629 | A1 | 9/2019 | Tripathi |
| 2019/0288631 | A1 | 9/2019 | Tripathi |
| 2019/0341820 | A1 | 11/2019 | Krizan et al. |
| 2020/0212834 | A1 | 7/2020 | Mazda et al. |
| 2020/0262398 | A1 | 8/2020 | Sato et al. |
| 2020/0328714 | A1 | 10/2020 | Tripathi |
| 2020/0343849 | A1 | 10/2020 | Coroban-Schramel |
| 2020/0366223 | A1 | 11/2020 | Coroban-Schramel |
| 2021/0146909 | A1 | 5/2021 | Serrano et al. |
| 2021/0203263 | A1 | 7/2021 | Serrano et al. |
| 2021/0351733 | A1 | 11/2021 | Carvell |
| 2022/0234451 | A1 | 7/2022 | Srinivasan |
| 2022/0416707 | A1 | 12/2022 | Chen |
| 2023/0114289 | A1 | 4/2023 | Islam et al. |
| 2023/0219426 | A1 | 7/2023 | Carvell et al. |
| 2023/0223885 | A1 | 7/2023 | Tripathi |
| 2023/0283211 | A1 | 9/2023 | Carvell |

(56) References Cited

U.S. PATENT DOCUMENTS

| | | | |
|---|---|---|---|
| 2024/0364250 | A1 | 10/2024 | Carvell |
| 2024/0372489 | A1 | 11/2024 | Srinivasan |
| 2025/0055397 | A1 | 2/2025 | Chen et al. |

FOREIGN PATENT DOCUMENTS

| | | | |
|---|---|---|---|
| CN | 104716754 | A | 6/2015 |
| CN | 204589885 | U | 8/2015 |
| CN | 105196877 | A | 12/2015 |
| CN | 205229379 | U | 5/2016 |
| CN | 106932208 | A | 7/2017 |
| CN | 107067780 | A | 8/2017 |
| CN | 207129052 | U | 3/2018 |
| CN | 108216026 | A | 6/2018 |
| CN | 108445386 | A | 8/2018 |
| CN | 110212725 | | 9/2019 |
| DE | 102014206342 | | 10/2015 |
| EP | 1612904 | | 1/2006 |
| EP | 2605398 | A1 | 6/2013 |
| FR | 2989479 | | 10/2013 |
| GB | 2273212 | | 8/1994 |
| JP | H05153705 | | 6/1993 |
| JP | 10243680 | | 9/1998 |
| JP | 2008-079686 | A | 4/2008 |
| JP | 2009-065758 | A | 3/2009 |
| JP | 2011-67043 | | 3/2011 |
| JP | 2012-228134 | | 11/2012 |
| JP | 5165660 | B2 | 12/2012 |
| JP | 2014-033449 | A | 2/2014 |
| JP | 5857472 | B2 | 12/2015 |
| JP | 2017-011970 | A | 1/2017 |
| JP | 2017-200382 | | 11/2017 |
| JP | 2018-033250 | A | 3/2018 |
| JP | 2020048254 | A | 3/2020 |
| KR | 10-2014-0073519 | | 6/2014 |
| KR | 10-2017-0021146 | A | 2/2017 |
| KR | 10-2017-0032976 | A | 3/2017 |
| WO | WO03/36787 | A1 | 5/2003 |
| WO | WO2012-010993 | A2 | 1/2012 |
| WO | WO 2012/144662 | | 10/2012 |

OTHER PUBLICATIONS

Ma et al. (CN 201222718 Y)Speed Regulating Device For Intellectual Dual Control Chopped Wave Type Middle Voltage Motor (Year: 2009).*

Cai et al., "Torque Ripple Reduction for Switched Reluctance Motor with Optimized PWM Control Strategy", https://www.mdpi.com/1996-1073/11/11/3215, Oct. 15, 2018, 27 pages.

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 15th International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Islam, U.S. Appl. No. 18/165,100, filed Feb. 6, 2023.

Farah et al., U.S. Appl. No. 18/184,569, filed Mar. 15, 2023.

Phillips, U.S. Appl. No. 18/305,776, filed Apr. 24, 2023.

Phillips, U.S. Appl. No. 18/348,255, filed Jul. 6, 2023.

International Search Report and Written Opinion dated Nov. 20, 2023 from International Application No. PCT/US2023/029142.

Parsels et al., U.S. Appl. No. 18/452,363, filed Aug. 18, 2023.

Islam et al., U.S. Appl. No. 18/452,050, filed Aug. 18, 2023.

Islam et al., U.S. Appl. No. 18/452,260, filed Aug. 18, 2023.

* cited by examiner

BOOSTED ROTOR SUPPLY CIRCUIT AND METHOD FOR IMPROVING PULSED ELECTRIC MACHINE EFFICIENCY

CROSS-REFERENCE TO RELATED APPLICATIONS

This application claims priority of U.S. Provisional Application No. 63/404,103 filed on Sep. 6, 2022, and which is incorporated by reference herein for all purposes.

BACKGROUND

The present application relates generally to pulsed control of an Externally Excited Synchronous Machines (EESM), and more particularly, to a boost circuit and method for (1) harvesting the field energy stored in an inductor of a rotor when the EESM is transitioning to the off state following an on pulses, (2) storing the harvested field energy on a storage device, (3) "topping" up the stored energy to make up for losses incurred in the power transfer and (4) supplying the harvested and stored field energy as a "boost voltage" to the rotor, just as the EESM is transitioning on for the next pulse, the boost voltage aiding the rotor in quickly overcoming it's start-up inductance, rapidly turning on the rotor, resulting in a much faster transition time from the off state to the on state at the start of the next pulse.

Most EESMs, which typically include a stator having a plurality of poles and a rotor, can operate as either a generator or a motor. When operating as motor, electrical energy is converted into mechanical energy. When operating as a generator, mechanical energy is converted into electrical energy. The terms "EESM", "electrical machine" or simply "machine" as used herein is therefore intended to be broadly construed to mean both electric motors and generators.

Electric machines have relatively high energy conversion efficiencies, provided they are operating at or near their optimal operational load. When operating below of their optimal operation load, however, their energy conversion efficiency is considerably lower. Since in many applications electric machines are required to operate below their optimal operational load, the overall operational efficiency of the machine is lower than it can be, which means energy is wasted.

Pulse control of electric machines is a known approach to improving efficiency. Under operating conditions below the peak efficiency range of a given machine, the electric machine is intermittently transitioned from an off state to an on state during pulsed operation. By controlling the magnitude, duty cycle, and frequency of the on pulses, the electric machine can be controlled to generate a needed output, while operating only in its peak efficiency range. As a result, overall efficiency is improved compared to conventional, continuous, operation below the peak efficiency range of the machine.

An issue with pulsed machine controlled machines is that a relatively large amount of energy and time is required to transition the rotor of a given electric machine from the off state to the on state with each pulse.

A need therefore exists to transition pulsed controlled electric machines quickly and efficiently from the off state to the on state with each pulse, thereby operating such electric machines at even higher levels of efficiency.

SUMMARY

The present application is directed to pulsed control of an Externally Excited Synchronous Machines (EESM), including a boost circuit and method for (1) harvesting the field energy stored in an inductor of a rotor when the EESM is transitioning to the off state following an on pulses, (2) storing the harvested field energy on a storage device, (3) "topping" up the stored energy to make up for losses incurred in the power transfer and (4) supplying the harvested and stored field energy as a "boost voltage" to the rotor, just as the EESM is transitioning on for the next pulse, the boost voltage aiding the rotor in quickly overcoming it's start-up inductance, rapidly turning on the rotor, resulting in a much faster transition time from the off state to the on state at the start of the next pulse.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Electric motors and generators are used in a very wide variety of applications and under a wide variety of operating conditions. In general, many modern electric machines have relatively high energy conversion efficiencies. However, the energy conversion efficiency of most electric machines can vary considerably based on their operational load. In general, when operating at or near their peak operational loads, electrical machines are highly efficient. However, when operating at lower load, efficiency tends to be much lower.

The present application relates generally to pulsed control of electric machines (e.g., electric motors and generators) to improve their energy conversion efficiency when operating conditions warrant. More specifically, under lower load operating conditions, an electric machine is pulsed controlled and intermittently transitioned between an off state and an on state during pulses. By controlling the magnitude, duty cycle and frequency of the pulses, the electric machine can be controlled to operate only at its higher efficiency levels compared to conventional continuous machine control, thereby delivering a desired average torque output in a more energy efficient manner than previously possible.

The Applicant has filed and received several U.S. Patents covering the pulsed control of electric machine, including U.S. Pat. No. 10,742,155 (TULA P200B), U.S. Pat. No. 11,228,272 (TULA P200C), and U.S. Pat. No. 10,944,352 (TULA P201). Each of the above-listed applications are incorporated by reference herein for all purposes.

Pulsed Machine Control

Figure 1:
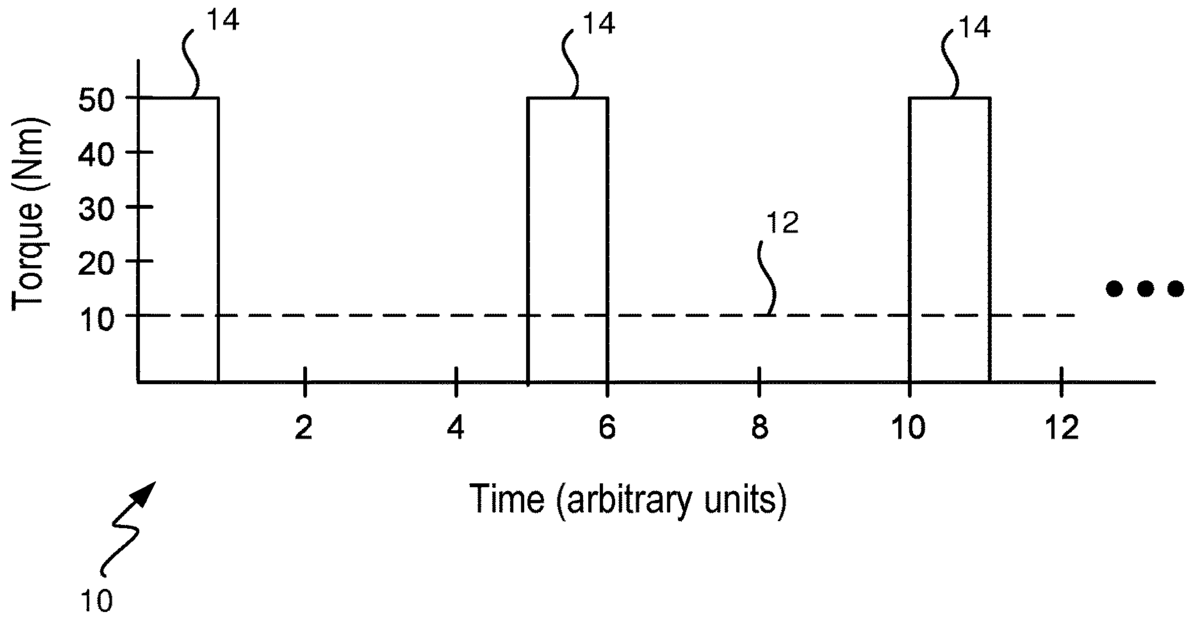
FIG. 1 is graph illustrating pulsed operation of a machine in accordance with a non-exclusive embodiment of the invention.

Referring to FIG. 1, a graph 10 illustrating the basic operation of pulsed machine control is illustrated. In this example, several assumptions are made, including:

The electric machine is operating as an electric motor.

As plotted along the vertical axis, the maximum torque output of the machine is 50 Nm.

The peak efficiency range of the machine is approximately 95% of its peak output, or a torque output of approximately 47.5 Nm.

The machine is requested, in this example, to generate an output toque of 10 Nm, which is well below its peak efficiency range.

With conventional operation, the machine is continuously operated to generate the requested torque output of 10 Nm. This is represented in FIG. 1 by the dashed line 12. The disadvantage of continuously operating with a torque output of 10 is that the machine is operating well below its peak efficiency range (e.g., 47.5 Nm or above in this example).

With pulsed operation on the other hand, the machine is pulsed on and off. Between on pulses, the machine is in the off state and generates little to no torque output. During the on pulses, the machine:

(1) Is in the on state and operates at or near its peak efficiency (i.e., at 50); and (2) The average torque output of the machine over time, during which the machine is intermittent pulsed between the off and on states, is sufficient to meet the ascertained torque request.

In this example, the frequency of the on pulses occur once every five (5) time units as plotted along the horizontal axis. As a result, the machine is pulsed on twenty percent (20%) of the time, as represented by the pulses 14. By operating the machine at its peak output (e.g., 50) every fifth time unit (i.e., twenty percent twenty percent (20%) of the time), the requested 10 Nm of torque is generated over time. However, since the machine is operated only at or near its peak efficiency during the pulses, the overall operating efficiency of the machine is significantly improved over conventional continuous operation.

Three-Phase Wound Field Synchronous Machine

In a three-phase wound field synchronous machine, the stator may include a three-coil winding that is excited by a three-phase AC input and the field windings on the rotor that are powered by a DC voltage power supply. When the three-phase AC input is passed through the three-phase armature windings, a rotating magnetic field (RMF) is generated. The rotational rate of the RMF is known as the synchronous speed ($N_s$) of the electric machine. The interaction of the rotor field winding fields and stator winding fields generates an electromagnetic force (EMF) causing the rotor rotation.

Power Converter

Figure 2:
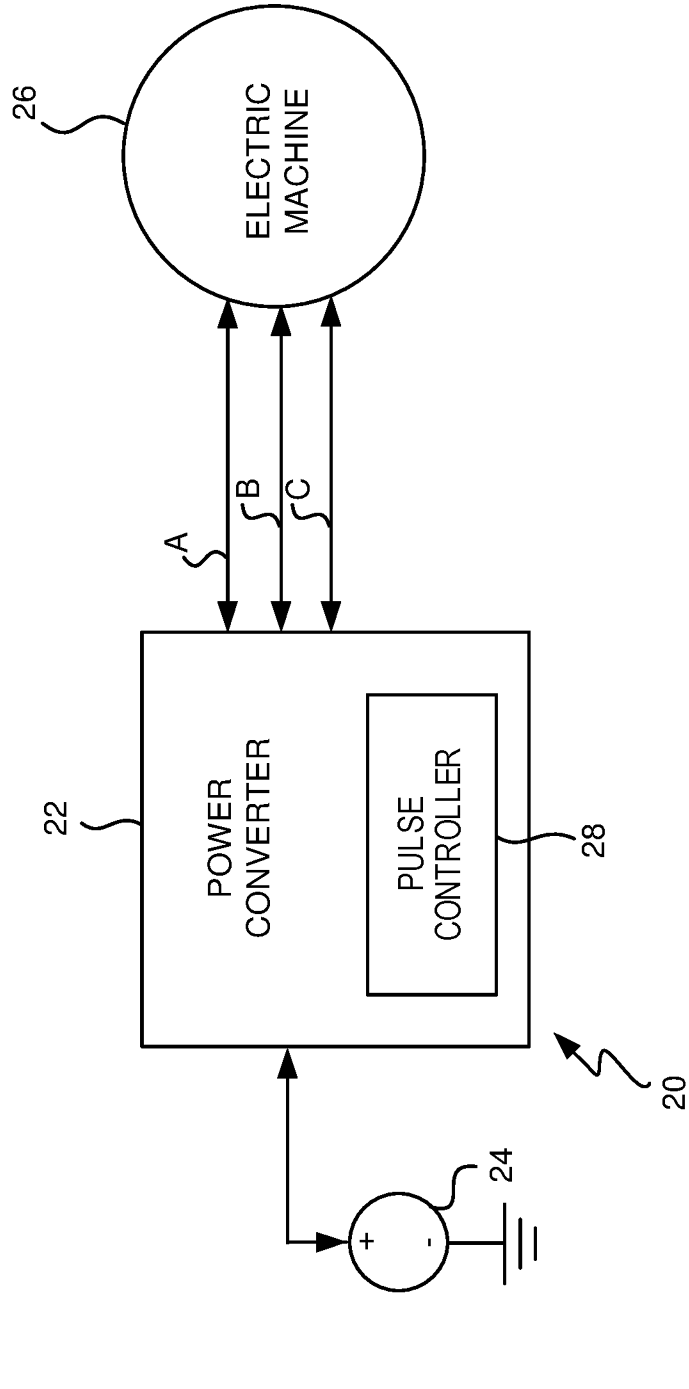
FIG. 2 is a functional block diagram illustrating a machine controller architecture in accordance with a non-exclusive embodiment of the invention.

Referring to FIG. 2, a diagram of a power controller 20 for pulsed operation of an electric machine is illustrated. The power controller 20 includes a power converter 22, a DC power supply 24, and an electric machine 26. In this non-exclusive embodiment, the power converter 22 also includes a pulse controller 28.

The power converter 22 may be operated as a power inverter or power rectifier depending on the direction of energy flow through the system.

The rotor field is generated by the application of DC current into the rotor field winding.

When the electric machine 26 is operated as a motor, the power converter 22 is responsible for generating three-phased AC power from the DC power supply 24 to drive the electric machine 26. The three-phased input power, denoted as phase A, phase B, and phase C, is applied to the windings of the stator of the electric machine 26 for generating the RMF as described above. In both cases the rotor field is generated by the inverter suppling current to the rotor winding.

During motor operation, the pulse controller 28 is responsible for selectively pulsing the three-phased stator input power and rotor current provided to the electric machine 26. During conventional (i.e., continuous) operation, the three-phases A, B and C of the stator input power and the rotor current are continuous (i.e., not pulsed). During pulsed operation, the three-phases A, B and C and the rotor current, are selectively pulsed.

When the electric machine is operating as a generator, the power converter 22 operates as a power rectifier and the AC power coming from the electric machine 26 is converted to DC power and is stored in the DC power supply 24. The rotor field needed to enable this transfer of power has to be supplied by the inverter.

The lines depicting the phases, A, B, and C are shown with arrows on both ends indicating that current can flow both from the power converter 22 to the electric machine 26 when the machine is operating as a motor, or that current can flow in the opposite direction when the machine is used as a generator.

The rotor current for motoring and generation flows into the machine from the inverter.

For rotor filed energy recovery the current flows from the machine to the inverter.

Pulsed Machine Control

Figure 3:
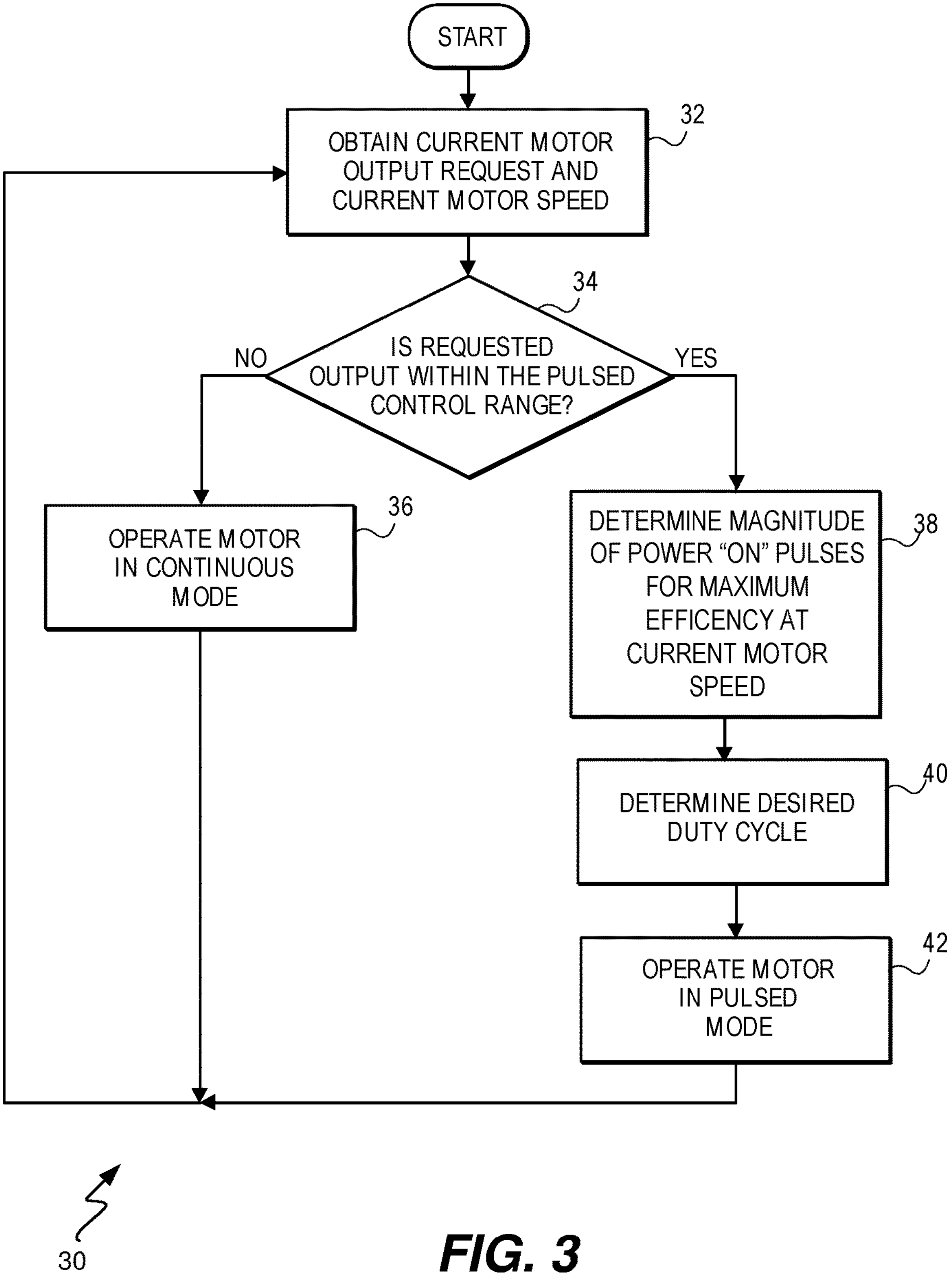
FIG. 3 is an operational flow diagram illustrating steps implemented by the machine controller in accordance with a non-exclusive embodiment of the invention.

Referring to FIG. 3, a flow diagram 30 illustrating steps implemented by the pulse controller 28 for pulsed control operation of the electric machine 26 while operating as an electric motor are shown.

In the initial step 32, the current machine output and current machine speed are ascertained.

In decision step 34, a determination is made based on the current machine output and current machine speed if the machine should be operated in a continuous mode or a pulsed mode. In other words, a determination is made if the desired machine torque is above or below the most efficient output torque range for the current machine speed (e.g., 47.5 Nm in the FIG. 1 example).

In step 36, the machine is operated in the continuous mode if the current machine torque request is above the most efficient output torque for the current machine speed.

In the alternative step 38, the machine is operated in the pulsed mode if the current machine torque request is below the most efficient output torque for the current machine speed.

In step 40, the desired pulse magnitude, duty cycle and frequency for operation in the pulsed mode are determined so that the average output power or torque over time matches the desired torque output.

In step 42, the machine is operated in the pulsed mode using the determined pulse magnitude, duty cycle and frequency of the pulses.

The above steps 32-42 are continuously performed while the machine is in operation. At any given machine speed, there will be a corresponding most efficient output torque at which the machine operates at or near its maximum efficiency. As the instantaneous machine output request and/or current machine speed change, a decision is made to operate the machine in either the continuous or pulsed mode as appropriate.

From a conceptual standpoint, the more often the desired machine torque is below the most efficient output torque for the current machine speed, the more significant the overall efficiency of the machine can be improved by pulsing the machine.

Pulse Rise Times

Current power converters are typically designed for continuous, not pulsed operation. Such power converters are typically required to transition from the unenergized to an energized state relatively infrequently. As a result, little design effort has been made to date in managing the transition time between when a machine is off to when it is turned on. To the extent any such efforts have been made, the focus is typically directed to achieving a smooth transition as opposed to a fast transition. The transition from a non-energized (off) to an energized state for most electric machines, is therefore, relatively not very fast.

The applicants have discovered that for an electric machine system that frequently transitions from a non-energized state to peak efficiency state such as with pulsed operation, further efficiency improvements can be realized when the transitions occur as fast as possible. With fast transitions, for example from zero torque to the peak efficiency torque, the overall average efficiency is improved because the machine spends less time in transition where efficiency is less than the peak. This relationship is depicted in FIG. 4A and FIG. 4B.

Figure 4A:
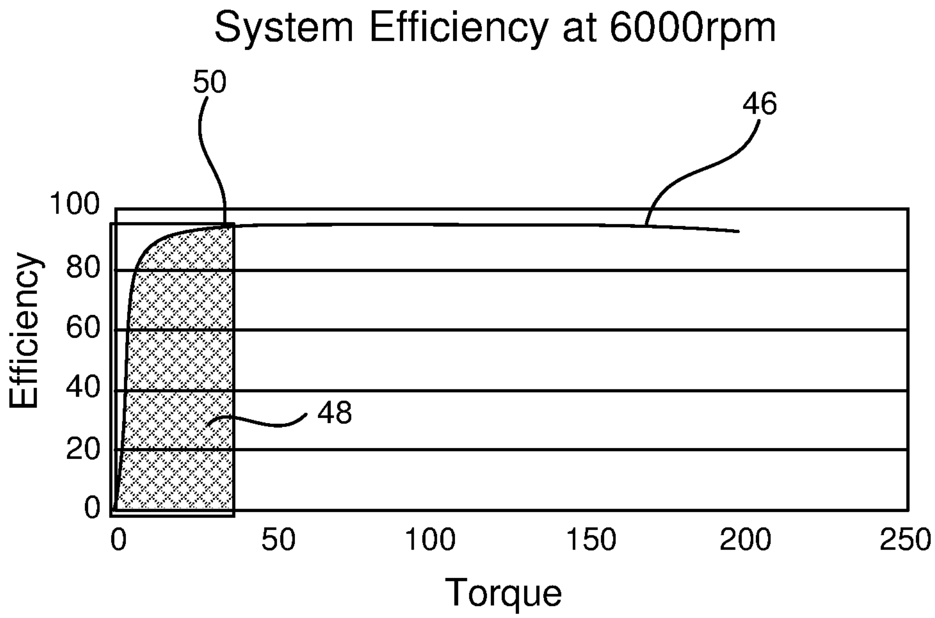
FIG. 4A is a torque versus efficiency map for a machine operating at a fixed speed during a transition from zero to peak efficiency torque.

Referring to FIG. 4A, a torque versus efficiency map for an exemplary electric machine operating as a motor at a fixed speed (e.g., 6000 rpms) is illustrated. In the exemplary map, a range of torque outputs from 0.0 Nm to 250 Nm is plotted along the horizontal axis, while the efficiency of the machine from 0.0 percent to 100 percent is plotted along the vertical axis. The curve 46 depicts the transition of the machine from zero to peak efficiency torque. During this transition, as depicted by the shaded region 48, the machine is operating at a much lower efficiency before reaching at or near the peak efficiency of the machine as depicted by reference number 50.

Figure 4B:
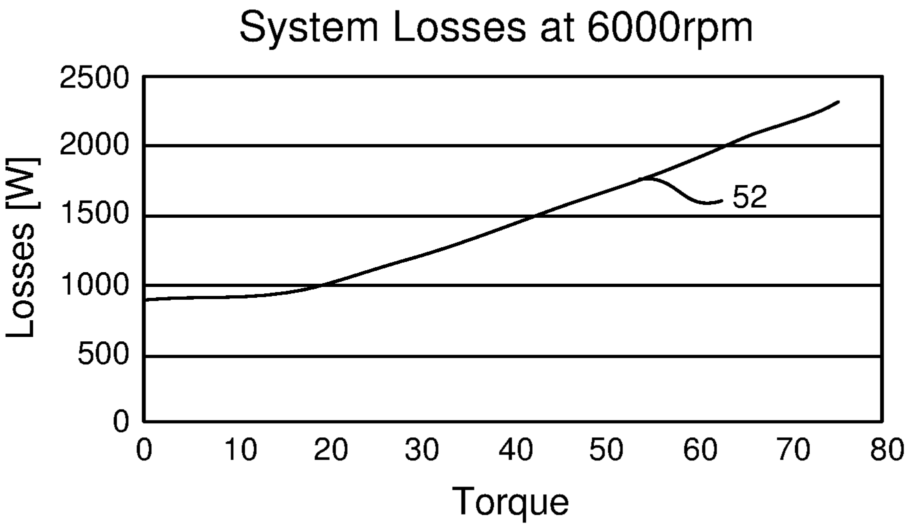
FIG. 4B is a torque versus work lost for an exemplary machine operating at a fixed speed during a transition from zero to peak efficiency torque.

Referring to FIG. 4B, a map is provided illustrating torque versus work lost for an exemplary machine operating at a fixed speed during a transition from zero to peak efficiency torque. In this map, the work losses (W) are plotted along the vertical axis, while the torque output of the machine is plotted along the horizontal axis. As demonstrated by the curve 52, the work losses of the machine increase as the torque output increases during the transition from zero to peak efficiency torque. Therefore, the faster that transition time from zero to peak efficiency torque, the less work is performed, and the less energy is consumed by the electric machine.

By substituting time in place of torque along the horizontal axis and then integrating the area under the curve 52, the energy consumed by the electric machine can be calculated for a given transition time. For instance, with an exemplary machine, 7234.5 Joules of energy is used with a transition time of 0.5 seconds, while only 723.4 Joules of energy were used a transition time of 0.05 second. This comparison demonstrates that the faster the transition time from zero to peak efficiency torque, the lower the energy consumed in losses. It should be noted that with this example, it is assumed that no acceleration of the load has taken place, so no energy has been added to the load. Just as efficiency is increased by reducing rise time, efficiency can also be increased by reducing pulse fall times as well.

For different machines, the transition of the machine from zero to peak efficiency torque, the peak efficiency torque and the work losses will all vary. The maps of FIGS. 4A and 4B should, therefore, be viewed as merely exemplary and should not be construed as limiting in any regard.

Applied Voltage vs. Rotor Current Rise Time

The Applicant has discovered that the time for transitioning an electric machine from the off state to the on state when pulsed can be significantly reduced by applying a boost voltage to the rotor at the start of each pulse. By applying the boost voltage, the inherent turn-on time determined by the inductance and resistance of the rotor is reduced, allowing the winding of the rotor to be rapidly energized to the target operating current, developing the desired rotor flux faster than would be the case without boosted rotor voltage. By significantly reducing the transition time, sometimes referred to as the "rise-time", from the off state to the on state for each pulse, the overall efficiency for pulsed controlled electric machines can be significantly improved.

Equation below (1) defines the current (i) in the inductor coil of a given rotor of an electric machine as a voltage V is applied.

$$i = \frac{V}{R}\left(1 - e^{\frac{-Rt}{L}}\right) \quad \text{Equation (1)}$$

where R is the resistance of the coil of the rotor, L is the inductance of the rotor winding (which is a function of the flux of the electric machine) and t is time. V is the available voltage which in the case of the rotor is equal to the applied voltage.

Equation (1) demonstrates that at least two ways the rise time here are two ways we can look at this equation to improve the rise time taken to reach a predetermined rotor current $I_f$. One is that we can look to reduce the resistance R and the second we can look to increase the voltage V.

If R is reduced, the time constant L/R remains constant because for a given winding slot, the resistance as a function of:

(a) The slot area divided by the number of turns (where the slot area is the area of the laminations that is available for copper wires to be inserted); and (b) As the length of the wire changes as a function of the number of turns, the resistance increases as the square of the number of turns.

However, the inductance also increases by the square of the number of turns. Hence, the L/R time constant remains the same for a given slot cross sectional area.

It is therefore evident from Equation (1) that the rise time of the rotor current can be reduced, resulting in a faster turn-on time of the rotor, by decreasing the number of turns, but keeping the slot fill (the of the slot filled with copper) the same, hence reducing the rotor windings resistance R.

Alternatively, we can keep the same rotor winding and just increase the applied voltage V by boosting the battery voltage to increase the rise time of the rotor current.

Rotor Field Energy

During operation of an electric machine, the rotor stores energy in the rotor magnetic field. The rotor is turned on by the application of the voltage V to the rotor winding. As the voltage is applied, the current in the rotor winding rises as per equation (1).

The field energy stored the rotor magnetic circuit is defined by Equation 2:

$$E = I_f^2 \times L_f/2 \text{ Joules} \qquad \text{Equation (2)}$$

where $I_f$ is the rotor current and $L_f$ is rotor winding inductance.

As explained in more detail below, the field energy E from the rotor is harvested and then stored on a storage device such as a capacitor. The stored energy for a capacitor is defined by:

$$E = V^2 \times C/2 \qquad \text{Equation 3}$$

where V is the applied voltage and C is the capacitance in Farads of the storage device.

It is noted that the energy E in the rotor and the energy that is harvested and eventually stored on the storage device are not necessarily the same. Typically, due to circuit losses, the harvested and stored energy is less than that in the rotor.

Boost Circuit

Figure 5A:
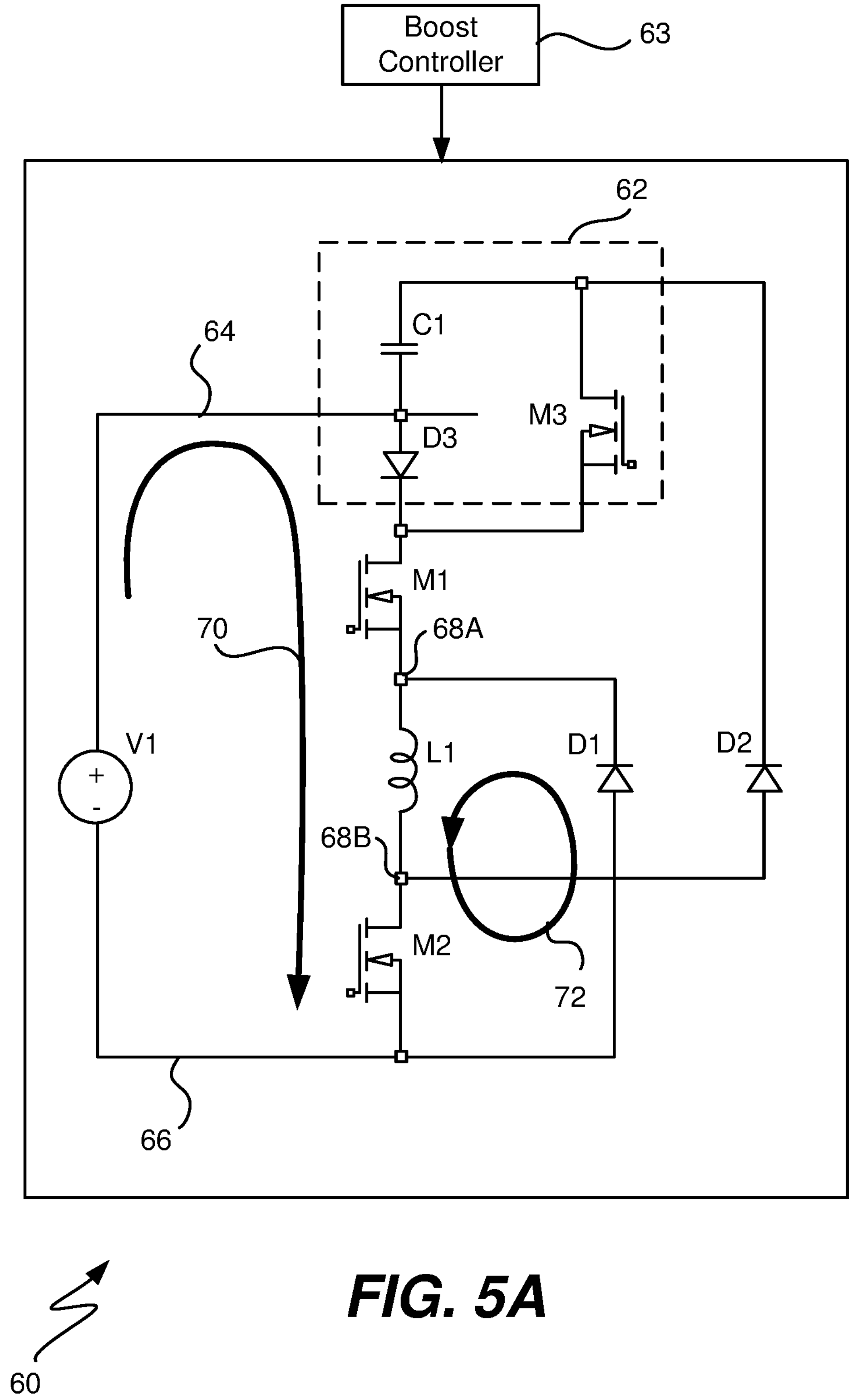
FIGS. 5A-5E illustrate various operational modes of an exemplary circuit of an electric machine in accordance with non-exclusive embodiments of the invention respectively.
Figure 5B:
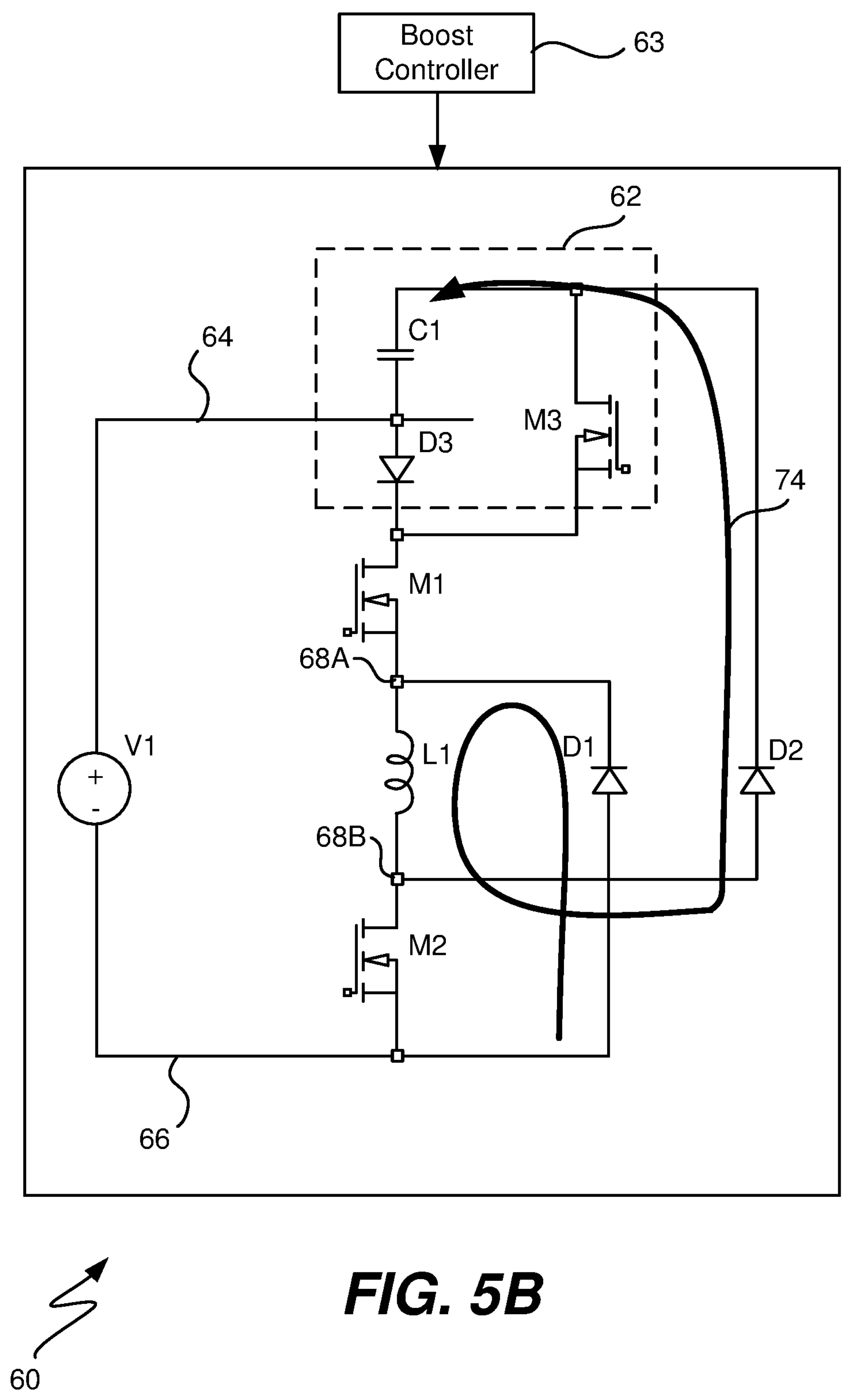

Referring to FIG. 5A, an exemplary rotor converter 60 of an electric machine with a boost circuit 62 and a rotor boost excitation controller 63 is illustrated. In much of the explanation below, the electric machine is operated as a motor.

The rotor converter 60 includes a voltage supply V1 such as a battery, coupled between a positive supply rail 64 and a negative power supply rail 66, an inductor L1 representative of the rotor winding (not shown), transistors M1 and M2, coupled to the upper end 68A and lower end 68B of the rotor winding L1 respectively, and diode D1. The transistor M1, the rotor winding L1 and the transistor M2 are coupled in series between the positive power rail 64 and the negative power rail 66. The diode D1 is coupled in parallel with the rotor winding L1 and M2, between the upper end 68A of the rotor winding L1 and transistor M1 and the negative power rail 66.

D2 would normally be connected directly to the positive power rail 68 but for this invention is used to direct the energy to the boost circuit 62.

The boost circuit 62 includes the additional components of diode D3, transistor M3 and capacitor C1. The components of the boost circuit 62, in addition to the transistors M1 and M2, are controlled at least partially by the boost controller 63.

Capacitor C1 in this case is shown as connected between the supply voltage positive and the boost voltage. In an alternative solution it may be connected between the supply voltage negative and the boost voltage.

In a non-exclusive embodiment, the transistors M1, M2 and M3 are MOSFET transistors. In other embodiments, other types of transistors, or any type of electronic switch, may be used for these components.

The boost controller 63 operates in cooperation with the pulse controller 28 as describe above. In general, the pulse controller 28 determines if the machine 60 should operate in the continuous mode or the pulsed mode. If the latter, the pulse controller 28 determines the magnitude, duty cycle and frequency of the on pulses as described above and directs the power converter 22 to energize the three-phases A, B and C of the stator (not shown) of the electric machine accordingly.

The boost controller 63, in cooperation with the pulse controller 28, operates the various components of the boost circuit 62 to harvest energy from the rotor winding L1 when the electric machine transitions to the off state, stores the harvested energy, and then applies the harvested energy as a "boost" voltage just as the rotor is turned on with the start of the next pulse. Specifically, the boost controller operates the various components of the electric machine and the boost circuit 62 to:

(a) store on the storage device C1 a boost voltage at least partially derived from energy harvested from the rotor winding L1 as the electric machine is transitioning from an on state at the end of an on pulse to an off state; and (b) apply the boost voltage to the rotor winding L1 at a start of a next on pulse as the electric machine transitions from the off state to the on state for the next on pulse.

When operating in the pulse mode, the rotor converter 60 and the boost circuit 62 cycle through four (4) distinct modes of operation for each on pulse. By cycling through these four modes, the boost energy is harvested at the end of each pulse and then stored. The boost voltage is thus available to apply to the rotor, along with the supply voltage V1, at the start of the next pulse. In this manner, the transition time for each pulse is significantly reduced.

The four distinct modes per on pulse include:

1. A regulation mode in which hysteresis control is used to maintain a target operating current through the rotor winding L1 at a desired level during the on pulse when the machine is in the on state;
2. A field harvesting mode when the energy E (equation 2) of the rotor winding L1 is captured and the remaining energy E (equation 3) after losses is stored on capacitor C1. The field harvesting mode typically occurs at the end of the pulse, as the machine 60 transitions from the on state to the off state.
3. An optional "topping up" mode where additional energy, from the power supply V1, is used to provide additional charge to the capacitor C1. Since the harvested and stored energy is subject to losses, the additional voltage may optionally be used so that the capacitor C1 maintains a desired boost level voltage; and
4. A boost mode where the boost voltage stored on the capacitor C1, in addition to the voltage V1, is provided to the rotor winding L at the start of a next on pulse.

Additionally, the magnitude of the boost voltage can be selected to achieve a desired transition time required for the rotor winding L1 to be energized and the rotor to be turned on. Generally, the larger the boost voltage, the quicker the transition. In which case the full energy stored on C1 may not be transferred to the rotor winding L1 as it is energized.

Referring to FIGS. 5A-5D, operation of the electric machine 60, the boost circuit 62, and the boost controller 63 in each of the four modes is illustrated respectively.

Regulation Mode

In the regulation, mode hysteresis control of the transistors M1 and M2 is used to precisely maintain the target operating current of the rotor winding L1 at a desired level during on pulses. The hysteresis control, as described below, is best understood with reference to FIG. 5A.

With the start of an on pulse, transistors M1 and M2 are turned on, while transistor M3 is turned off. As a result, current flows (as depicted by the arrow 70) from the power source V1, over positive power rail 64, and through diode D3, transistors, M1 and M2 and the rotor winding L1 to the negative rail 66. With both transistors M1 and M2 are turned on, the current increases at a rate determined by the impedance of the above-mentioned components along the current path defined by arrow 70. As the current rises, given sufficient voltage it will eventually exceed the target operating current. When the current exceeds the target, then transistor M1 is turned off. With M1 off, Back Electromagnetic Force (BEMF) is generated in the coils of the rotor winding L1, causing the upper end 68A of rotor winding L1 to become negative. When this occurs, diode D1 turns on, allowing the current to decay as it flows through the rotor winding L1, transistor M2 and diode D1, as depicted by the circular arrow 72. Once the current has decayed below the target operating current, transistor M1 is turned back on, allowing the current to increase. By repeating the above, the target operating current through the rotor winding L1 can be precisely maintained for the duration of a given pulse.

Although it is envisioned above that the control will be of hysteresis type it may also be of any other digital on/off control type as well including but not solely fixed or variable frequency PWM.

Harvesting Mode

In the harvesting mode, the energy maintained in the rotor winding L1 when the electric machine is in the on state is captured as a transition occurs to the off state at the end of an on pulse. The remaining energy, after unavoidable circuit losses, is stored on capacitor C1. The harvesting mode, as described below, is best understood with reference to FIG. 5B.

At the end of an on pulse, the pulse controller 28 and the boost controller 63 cooperate to turn transistors M1 and M2 off. Since the rotor winding L1 is energized, an open circuit induces a BEMF in the rotor winding L1 such that the upper end 68A becomes negative, and its lower end 68B becomes positive. Since the BEMF is larger than the supply voltage V1, current flows through diode D1, rotor winding L1, diode D2 and the capacitor C1, as depicted by the arrow 74. Most of the BEMF energy generated by the rotor winding L1 is, therefore, harvested and stored on the capacitor C1, subject to circuit losses, as the electric machine transitions from the on state to the off state at the end of an on pulse.

Topping Up Mode

In the optional topping up mode, power from the power supply V1 can be used to "top up" the capacitor C1 if it is not adequately charged to a suitable or desired level. The boost voltage stored on capacitor C1 is preferably charged to a desired level to meet a specified rotor off-to-on transition time for the start of the next on pulse. If the voltage charge on capacitor C1 is inadequate due to circuit losses or any other reason, the voltage source V1 may be used to "top up" the capacitor with additional voltage.

Figure 5C:
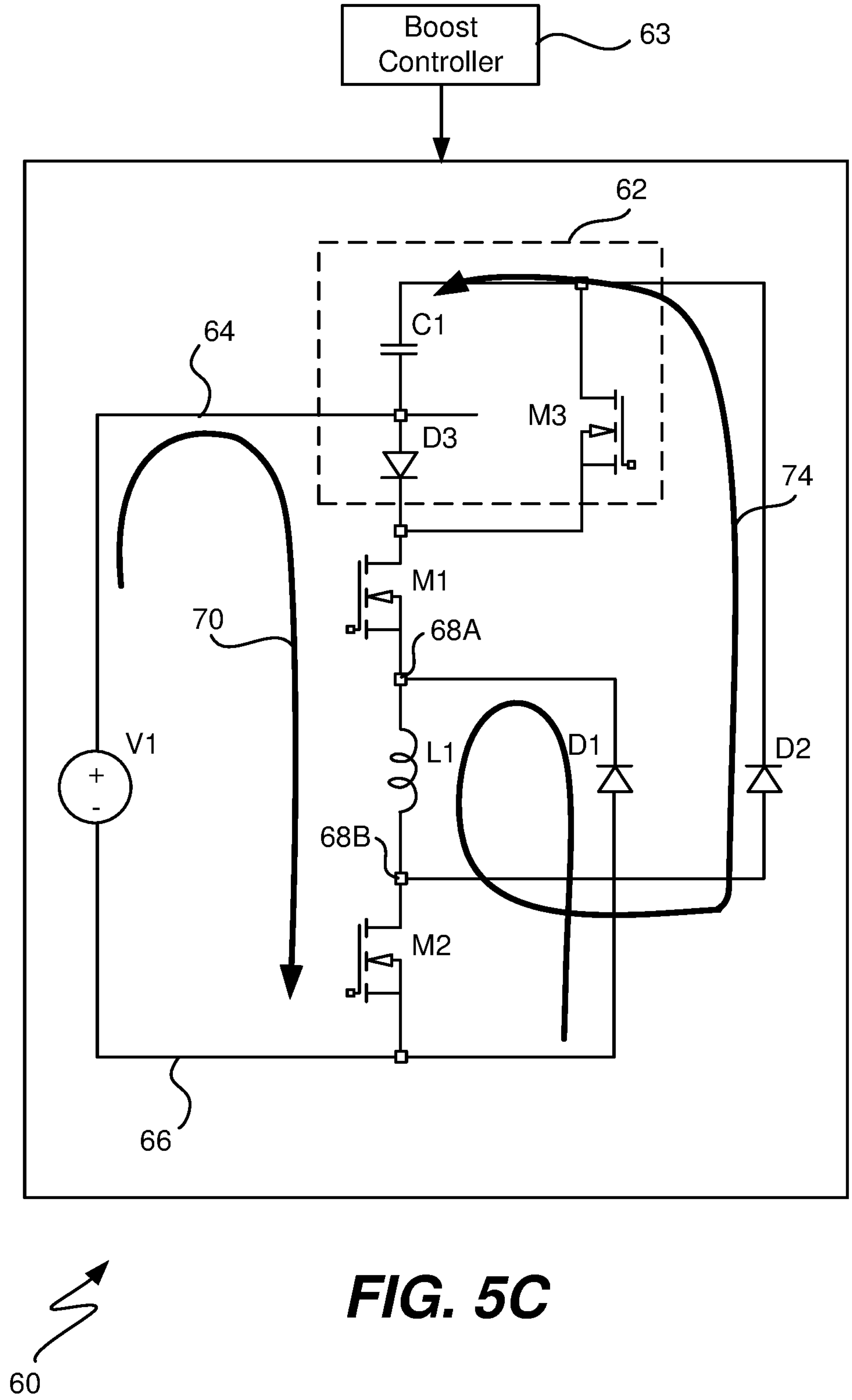

In one topping up mode embodiment with reference to FIG. 5C, the transistors M1 and M2 are selectively turned on and off using Pulse Width Modulation (PWM). Initially, transistors M1 and M2 are both turned on briefly, allowing the rotor winding L1 to be energized by voltage V1 as current flows from the positive to the negative rails 64, 66 (arrow 70). Once energize, both transistor M1 and M2 are turned off, and the extra energy provided to the rotor winding L1 induces a BEMF (in this situation, sometimes referred to as "fly back" energy) that is transferred to the capacitor C1 using the current path depicted by arrow 74. As a result, additional energy is added to the boost voltage already harvested and stored on the capacitor C1.

Figure 5D:
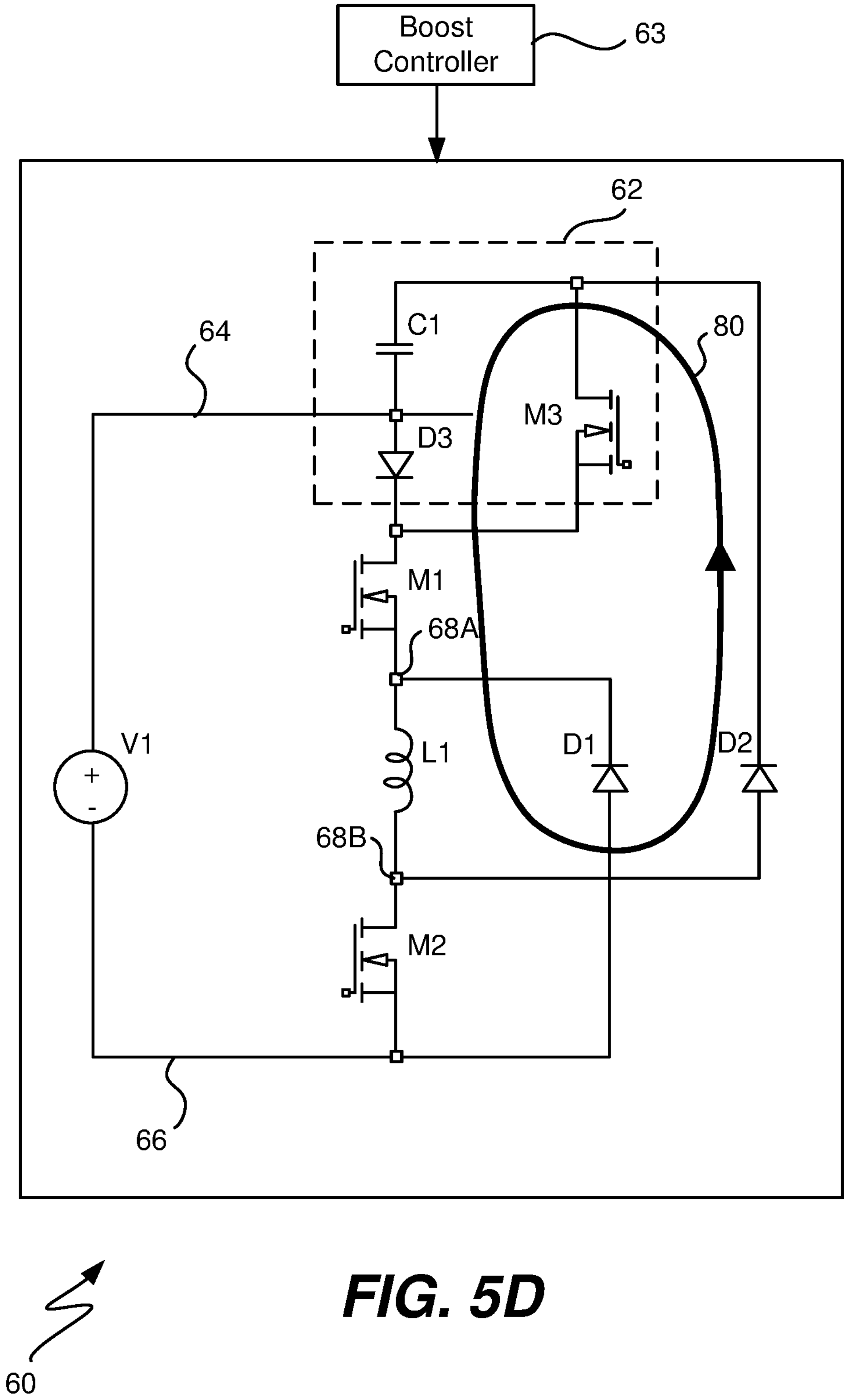

An alternative method of topping up the energy stored in the capacitor C1 illustrated in FIG. 5D. In this embodiment, transistor M1 maintained on while transistor M2 is modulate on and off. When both transistor M1 and transistor M2 are on, the rotor winding L1 of the rotor is energized. When transistor M2 is turned off, the BEMF of rotor winding L1 is captured on C1 via diode D2, as depicted by the arrow 80. Thus, by modulating transistor M2 on and off, the rotor winding L1 can be repeatedly energized, and its energy harvested and stored on capacitor C1. This process can be repeated until the charge on C1 has reached a desired level.

It is noted that the topping mode may be implemented at any time during pulsed controlled operation of the electric machine. When in the off state there is no stator current, so no torque is produced. When in the on state we draw a little more power from the voltage source V1 and instead of circulating the current as per the arrow 72 shown in FIG. 5A, both M1 and M2 are turned off allowing some energy to return to C1 before once again circulating the current in the normal manner.

Boost Mode

Figure 5E:
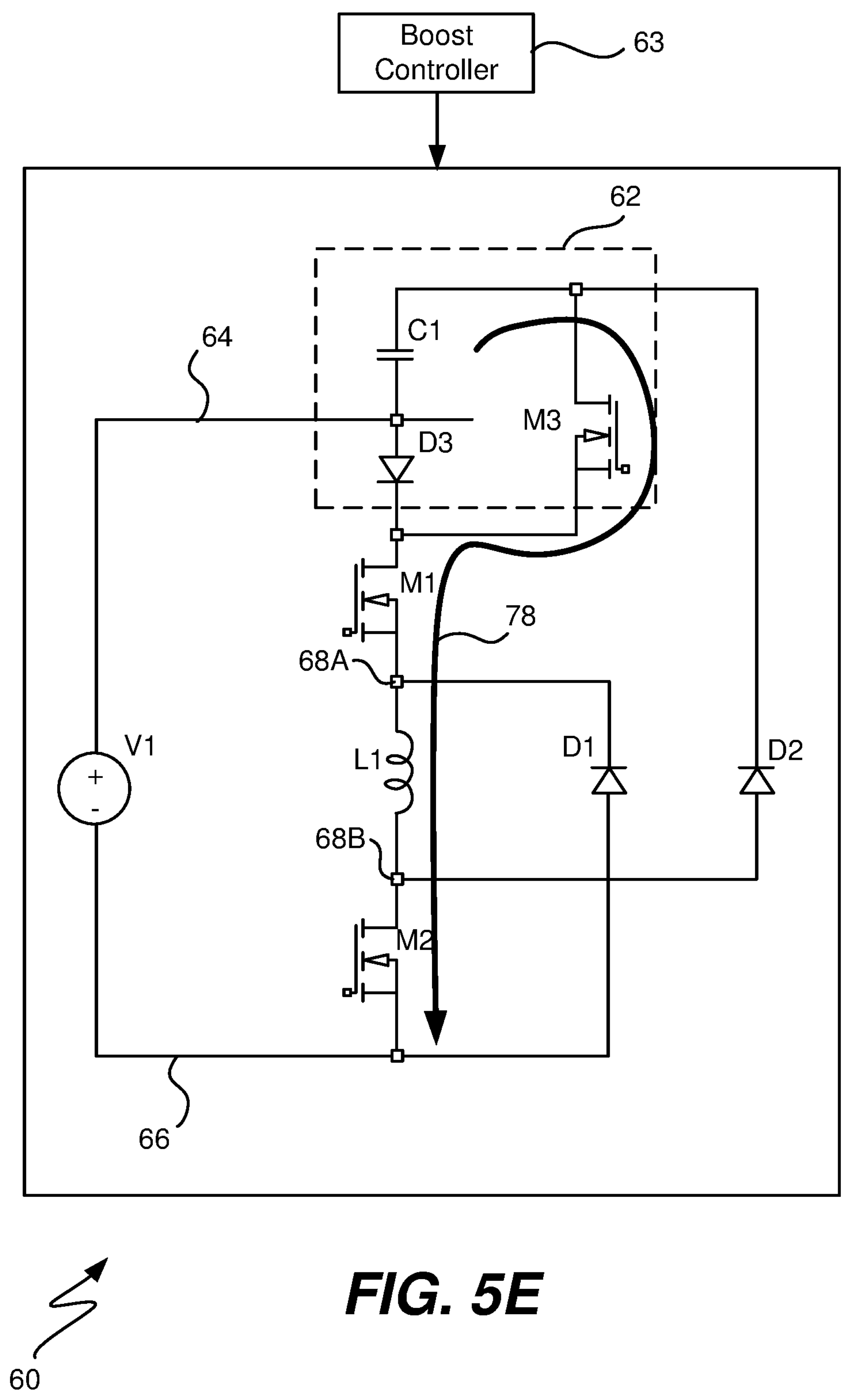

Finally, in the boost mode, as best depicted in FIG. 5E, the boost voltage stored on capacitor C1 is applied to the rotor winding L1 as the electric machine begins a transition from the off state to the on state at the start of a next pulse. The boost voltage may include just the energy previously harvested from the inductor L1, or a combination of the harvested energy and the generation of any "topping up" off voltage as explained above. Either way, the stored energy is returned to the rotor winding L1 to aid the supply voltage V1 in rapidly energizing the rotor. When the boost voltage is to be applied to the rotor winding L1, transistors M1, M2 and M3 are all turned on, providing a current path (arrow 78) from the capacitor C1, through the inductor L1, and to the negative rail 66, enabling the boost voltage to aid in quickly energizing the rotor.

As the boost voltage is applied to the rotor, the charge on the capacitor C1 is dissipated. Once sufficient or all the energy is transferred, the voltage V1 continues to energize the rotor winding L1 through D3 for the remainder of the on pulse. M3 can then be turned off.

With the above-described embodiment, much of the existing electric components of the rotor converter 60, with a few additional components as described herein, are used to harvest, store, and apply a boost voltage. Since many already existing elements of the rotor converter 60 are used, the benefits of faster transition times are realized almost for "free", with little overhead in terms of additional circuitry or components.

It is further noted that the specific components mentioned herein are merely exemplary and in no manner should be construed as limiting. On the contrary, any type of components may be used to bring about the functionality and operation of the boost circuit 62 and/or boost controller 63 as described herein.

In one alternative embodiment, the MOSFETs or similar switches, can be used in place of the diodes D1, D2, and D3 respectively. One advantage of using MOSFETS, or similar switches, is that they offer a low voltage drop when in the on state, thereby improving efficiency. However, the use of MOSFETS or similar switches may require additional control circuitry and signals. In yet other embodiments, one or more of the diodes D1, D2 and/or D3 may be Schottky diodes, fast epitaxial diodes, or standard diodes, or any combination thereof.

Pulse Control Operation with Boost

The above described four modes may be continually repeated while the electric machine is operating in the pulsed mode. With each on-off cycle, the regulation, harvesting, and boost (and optionally the topping up) modes are repeated. By repeating this process with each pulse, the overall efficiency of the electric machine can be significantly improved as the transition times for turning on the rotor from the off to the on states with each pulse is significantly reduced.

Figure 6:
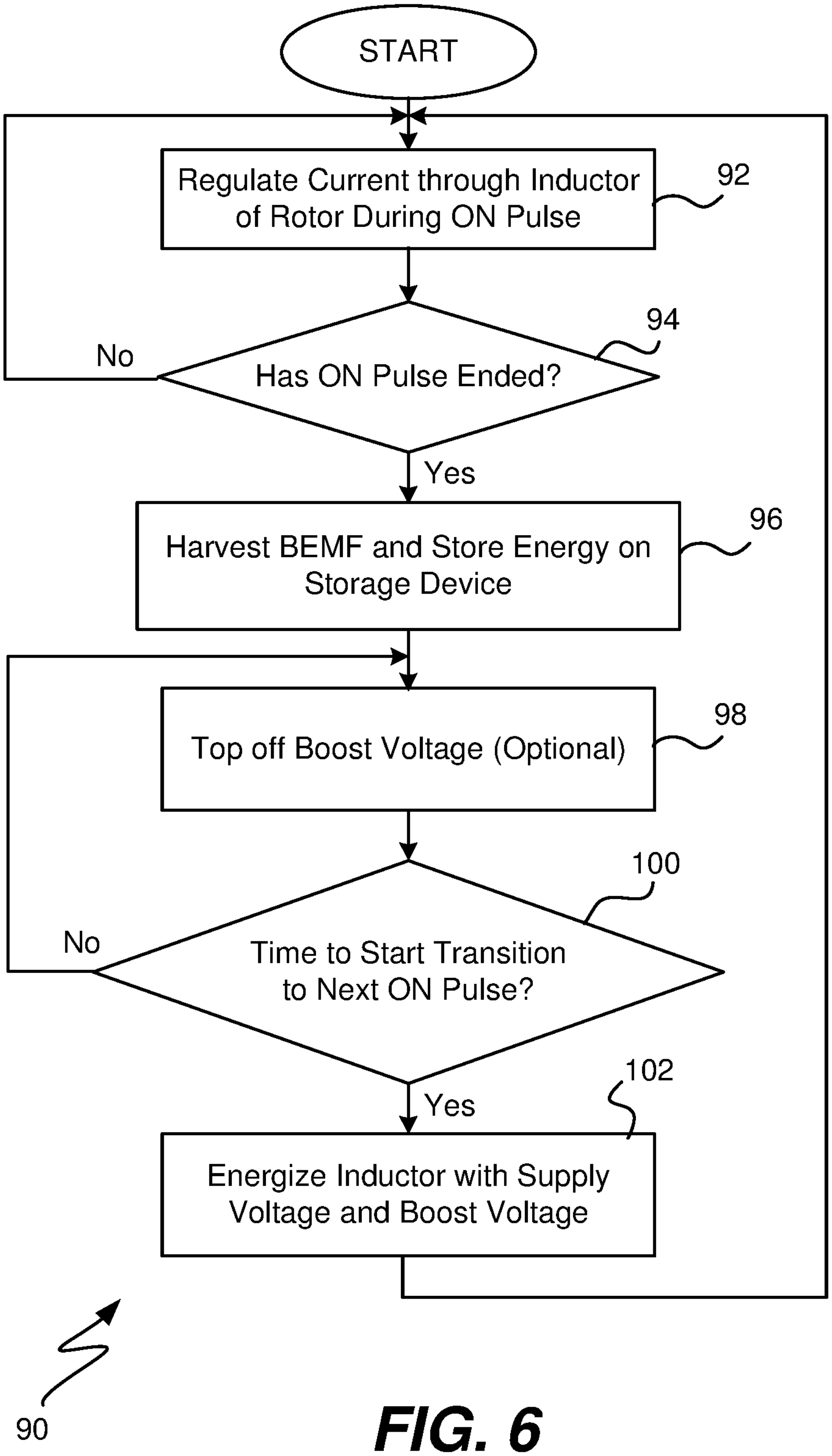
FIG. 6 is a flow diagram illustrating steps for operating an electric machine pulsed operation in accordance with a non-exclusive embodiment of the invention.

Referring to FIG. 6, a flow diagram 90 illustrating steps for efficiently operating an electric machine is illustrated.

In the initial step 92, electric machine 60 is in the on state during an on pulse, and the target operating current through the rotor winding L1 is precisely regulated using hysteresis as described herein.

In decision step 94, the boost controller 93 determines when the current pulse has ended.

In step 96, the boost controller 93 takes steps to harvest the BEMF energy induced in the rotor winding L1 as the electric machine transitions from the on state to the off state at the end of the pulse. The harvested energy is stored on a storage device C1 as a boost voltage.

In an optional step 98, the boost voltage stored on storage device C1 may optionally be topped off.

In decision step 100, the boost controller 93 determines if it is time to start a transition from the off state to the on state for the next on pulse.

Finally, in step 102, the rotor winding is energized with the combination of both the supply voltage V1 and the boost voltage from the storage device C1 as the electric machine transitions from the off state to the on state at the start of the next pulse. With the extra boost voltage, the transition time is reduced relative to if the boost voltage was not applied.

If there is insufficient time to top up the energy stored in C1 during step 98 then this may be done between step 92 and 94.

The steps 92 through 102 are preferably continually repeated for each pulse as the electric machine cycles between the off and on states. In this way, the boost voltage is harvested at the end of each pulse, stored, and applied to the rotor winding at the start of the next pulse. Consequently, the time for transitioning between the off state and the on state for each on pulse is significantly reduced, improving the overall operational efficiency of the electric machine.

The Applicants have found that the use of a boost voltage as described herein has significantly reduced the transition time from the off state to the on state compared to any non-boosted electric machine equivalents. As a result, the overall efficiency of such electric machines is significantly improved.

Generator Operation

Although the above description has been largely directed to the operation of an electric machine as a motor. In no way should this be construed as limiting. On the contrary, a boost voltage to the rotor winding as described herein can also be used during pulsed control operation as a generator as well.

Electric Machine Types

It should be apparent from the foregoing description that the described boosted pulsed machine control can be utilized in electric machine having externally excited fields. The present invention should, therefore, be broadly construed to include any such machines and not just those explicitly mentioned herein.

Electric Machines and Vehicles

Electric vehicles are now common and are increasing in popularity. It has been predicted that over the course of the next decade or two, electric vehicles will surpass or altogether replace conventional internal combustion engine vehicles.

With electric vehicles, one or more onboard machines is/are provided. When driving the vehicle, the machine acts as a motor to generate torque, which in turn, is used to propel the vehicle. In the case of an electric vehicle, the electric machine(s) is/are used exclusively to generate the needed torque. The torque may be a positive torque to propel the vehicle or a negative torque to transfer vehicle kinetic energy into stored electrical energy. With hybrid vehicles, the onboard electric machines may be used either exclusively, or in cooperation with, an internal combustion engine, to propel the vehicle. With regenerative braking, the machine is typically used to convert mechanical energy into electrical energy that is stored in a storage device, such as a battery or capacitor. The stored energy can be used by the electric machine when operating as a motor, or alternatively to power other electrical bs on the vehicle, such as the air conditioner, heater, defroster, various lighting systems, entertainment system, etc.

The pulsing of an onboard electric machine, with boost voltages as described herein, on a vehicle promises significant advantages for increased efficiency. By increasing efficiency, the range of the vehicle can be increased before either a battery recharge is needed and/or refueling is needed as is the case with hybrids.

Additional Embodiments

Motors used in Heating, Ventilation and Air Conditioning (HVAC) applications are another good example of an application that can benefit from pulsed control. There are several factors that contribute to pulsed motor control being a good fit for HVAC applications. These include the facts that: (a) the motors used in HVAC applications today are predominantly induction motors that don't contain permanent magnets; (b) a high percentage of the motors used in HVAC applications, including in particular variable speed HVAC condensers and/or air handlers, operate a substantial portion of the time operating regions below their high efficiency areas; and (c) the inertia of a fan or pump normally dominates the motor inertia, which tends to further mitigate potential NVH related impacts associated with pulsing.

Although only a few embodiments of the invention have been described in detail, it should be appreciated that the invention may be implemented in many other forms without departing from the spirit or scope of the invention. The various described pulse controllers and other control elements may be implemented, grouped, and configured in a wide variety of different architectures in different embodiments. For example, in some embodiments, the pulse controller may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

Generally, the schemes for pulsed motor control may be implemented digitally, algorithmically, using analog components, or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In certain me implementations, the described control schemes may be incorporated into object code to be executed on a digital signal processor (DSP) incorporated into an inverter controller (and/or rectifier controller in the context of a generator and/or a combined inverter/rectifier controller).

Therefore, the present embodiments should be considered illustrative and not restrictive, and the invention is not to be limited to the details given herein but may be modified within the scope and equivalents of the app ended claims.

What is claimed is:

1. An electric machine comprising:

a pulse controller configured to pulse the electric machine between an on state during on pulses of the electric machine and an off state between the on pulses;

a rotor having a rotor winding configured to be energized during the on pulses when the electric machine is in the on state and to be de-energized when in the off state between the on pulses; and a boost circuit configured to harvest energy maintained in the rotor winding when energized in the on state during on pulses, the boost circuit further configured to store the harvested energy as a "boost" voltage on a storage device and to provide the boost voltage to the rotor during transitions of the electric machine from the off state to the on state at the start of next on pulses respectively, the boost voltage causing the rotor to turn on faster, by energizing the rotor sooner, thereby reducing a transition time for the electric machine to transition from the off state to the on state for the next on pulses, relative to if the boost voltage were not provided to the rotor during the transition.

2. The electric machine of claim 1, further configured to operate in a regulation mode in which hysteresis or any other type of on/off control is used to maintain a target operating current through the rotor winding at a desired level when the machine is in the on state during the on pulses.

3. The electric machine of claim 1, further configured to operate in a harvesting mode wherein the energy maintained in the rotor winding is harvested and stored on the storage device during transitions of the electric machine from the on state during on pulses to the off state between the on pulses.

4. The electric machine of claim 1, further comprising a "topping" up mode wherein an additional energy, from a power supply, is added to the boost voltage stored on the storage device.

5. The electric machine of claim 4, wherein the additional energy provided to the storage device occurs when the electric machine is in the on state during the on pulses.

6. The electric machine of claim 4, wherein the additional energy provided to the storage device occurs when the electric machine is in the off state between the on pulses.

7. The electric machine of claim 1, further configured to operate in a boost mode where the boost voltage is provided to the rotor during the transition of the electric machine from the off state to the on state at the start of the next on pulse.

8. The electric machine of claim 1, wherein the storage device is a capacitor.

9. The electric machine of claim 1, further comprising a rotor boost circuit controller configured to selectively control a first transistor coupled to a first end of the rotor winding and a second transistor coupled to a second end of the rotor winding.

10. The electric machine of claim 9, wherein the rotor boost circuit controller is configured to selectively turn the first transistor and the second transistor off to allow the energy maintained in the rotor winding to flow to the storage device when charging the storage device with the boost voltage.

11. The electric machine of claim 9, wherein the rotor boost circuit controller is configured to use hysteresis, or any other type of on/off control, to control a target operating current through the rotor winding to a desired level when the electric machine is in the on state during the on pulses by selectively turning the first transistor and the second transistor on and off as needed to maintain the target operating current at the desired level.

12. The electric machine of claim 9, wherein the rotor boost circuit controller is further configured modulate the first transistor and the second transistor on and off to enable an additional energy, from a power supply, to be stored on the storage device in addition to the boost voltage harvested from the rotor winding.

13. The electric machine of claim 9, wherein the rotor boost circuit controller is further configured turn on the second transistor and a third transistor to enable the boost voltage from the storage device to be applied to the rotor winding during the transitions of the electric machine from the off state to the on state at the start of the next on pulses respectively.

14. The electric machine of claim 1, further comprising a power source to provide a voltage, in addition to the boost voltage, to the rotor winding at the start of the next pulses, the voltage from the power supply and the boost voltage acting together to energize the rotor winding during the transitions of the electric machine from the off state to the on state at the start of the next on pulses respectively.

15. The electric machine of claim 14, wherein the boost voltage from the storage device dissipates as the rotor winding is energized during the transitions of the electric machine from the off state to the on state at the start of the next on pulses respectively.

16. A method of operating an electric machine, the method comprising:

(a) storing on a storage device a boost voltage at least partially derived from energy harvested from rotor winding of the electric machine as the electric machine is transitioning from an on state during an on pulse to an off state; and (b) applying the boost voltage to the rotor winding at a start of a next on pulse as the electric machine transitions from the off state between on pulses to the on state during the next on pulse, wherein the boost voltage causes the rotor to turn on faster, by energizing the rotor sooner, thereby reducing a transition time for the electric machine to transition from the off state to the on state for the next on pulses, relative to if the boost voltage were not provided to the rotor during the transition.

17. The method of claim 16, wherein the energy harvested from the rotor winding is derived from a Back Electromagnetic Force (BEMF) generated by the rotor winding.

18. The method of claim 16, wherein storing the boost voltage on the storage device is further derived at least partially from energy from a power supply.

19. The method of claim 16, further comprises applying a voltage from a power supply, in addition to the boost voltage, to the rotor winding as the electric machine transitions from the off state to the on state during the next pulse, the boost voltage and the voltage from the power supply acting together to energize the rotor winding during the transition.

20. The method of claim 19, wherein the boost voltage on the storage device dissipates as the rotor winding is energized as the electric machine transitions from the off state to the on state.

21. The method of claim 16, further comprising repeating (a) and (b) and the electric machine transitions from the off state to the on state for each of the on pulses during pulsed operation of the electric machine.

* * * * *